United States Patent

Urban

[15] 3,694,791

[45] Sept. 26, 1972

[54] LOCKING TRANSISTOR SOCKET

[72] Inventor: Joe F. Urban, 3000-N. 43rd St., Waco, Tex. 76710

[22] Filed: Jan. 11, 1971

[21] Appl. No.: 105,259

[52] U.S. Cl. ....................339/75 T
[51] Int. Cl. ....................H01r 13/54
[58] Field of Search....................339/74–79, 274

[56] References Cited

UNITED STATES PATENTS 2,888,658 5/1959 Welch....................339/75 T

FOREIGN PATENTS OR APPLICATIONS 72,723 4/1960 France....................339/75 MP

*Primary Examiner*—Joseph H. McGlynn

[57] ABSTRACT

A socket for locking transistors into electronic circuits. This socket includes a pivotable lever which when pivoted towards the transistor, will urge the socket closed on the transistor's connectors, the lever also when in closed position will prevent the removal of the transistor until the lever is released, thus preventing damage to the transistor.

1 Claim, 2 Drawing Figures

INVENTOR.
JOE F. URBAN

LOCKING TRANSISTOR SOCKET

This invention relates to transistor sockets, and more particularly to a locking transistor socket.

It is therefore the primary purpose of this invention to provide a locking transistor socket which when a lever is released will allow the removal of the transistor without damaging it in order that the electronic circuit may be properly serviced.

Another object of this invention is to provide a transistor socket which will prevent the destruction of transistors when they are pulled from or unsoldered from a circuit.

A further object of this invention is to provide a transistor socket which will have the locking lever pivotable within a recess of the socket, the lever extending upwards and over the transistor when it is locked in place, the arrangement preventing anyone from removing the transistor without unlocking the lever by pivoting it away from the transistor.

A further object of this invention is to provide a socket of the type described which may have a plurality of openings and the socket pins may be labeled for transistors that are not of the standard type.

Other objects of the present invention are to provide a locking transistor socket which is simple in design, inexpensive to manufacture, rugged in construction, easy to use and efficient in operation.

Figure 1:
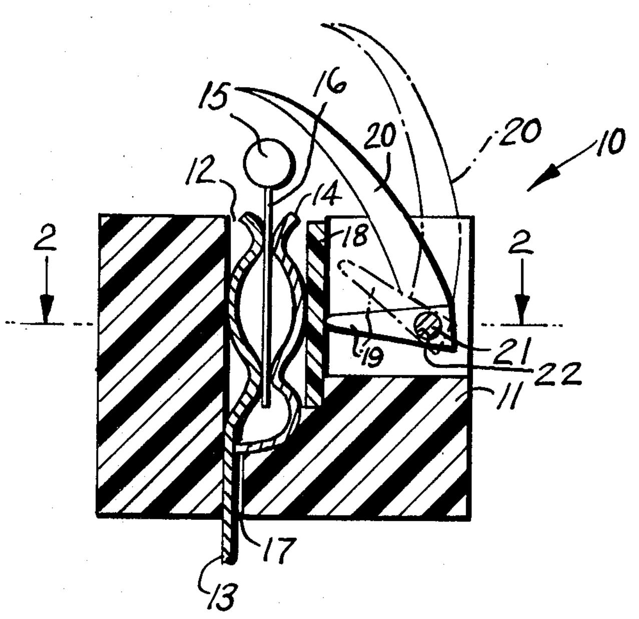
Figure 2:
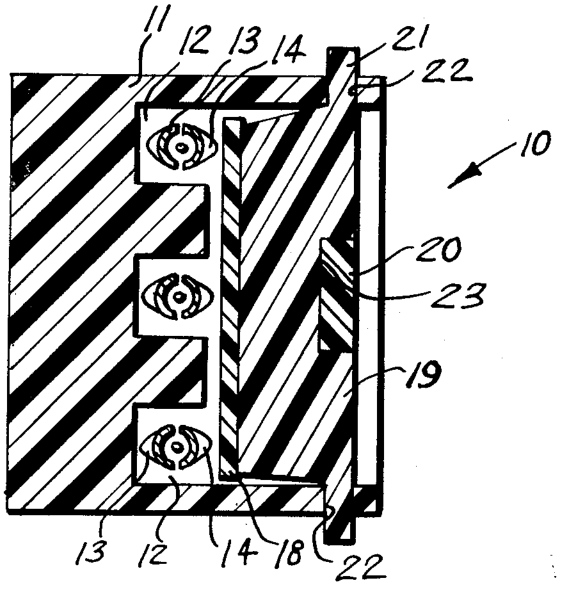

These and other objects will be readily evident upon a study of the following specification and the accompanying drawing wherein:

FIG. 1 is an end view of the present invention shown in elevation and in section; and FIG. 2 is a cross-sectional view taken along the lines 2—2 of FIG. 1.

According to this invention, a locking transistor socket 10 is shown to include a heat resistant block of plastic material 11 having opening 12 which carry socket pins 13 which by means of a spring-like conductor 14 will secure transistor 15 by means of its prongs 16 within socket 10.

The socket pins 13 extend from the openings 17 on the underside of socket 10 wherein they are connected to the electronic circuit (not shown).

A flat plate 18 of heat resistant plastic, bears against the conductor 14 when the flat arm 19 of lever 20 is urged downward and against plate 18, the result being that the socket pins 13 and the conductors 14 will securely hold their respective transistors 15.

It shall be noted that the arcuate configuration of lever 20 is such that when it is in its closed position the outer extremity will be over the transistor 15 thus discouraging anyone from removing transistor 15 until after lifting the lever 20 which offers a second safety factor for socket 10 in order to protect transistor 15 from damage.

The arm 19 of lever 20 is provided with projecting means 19 which are pivotaly carried within openings 22 of block 11.

It shall further be noted that lever 20 is secured fixedly within the opening 22 in a suitable manner and is flush with the back end of arm 19.

What I claim is:

1. A locking transistor socket comprising an insulated block, an insulated bar, one or more metal clamps and a camming lever, said block having a cavity for seating said clamps against one wall thereof, said bar positioned on the side of said clamps opposed to said wall effectually sandwiching said clamps, said bar movable towards said clamps by said lever pivoted in said block, the camming portion of said lever stopping at dead center or beyond for positive immobility upon manual release of said lever after inserting the terminals of a transistor in said clamps, said transistor terminals then held immobile and in electrical contact with said clamps, said lever arm extending the full width of, and covering, said transistor in the clamping position, said clamps having metal extension below said block for making circuitry connections.

* * * * *